United States Patent
Hammes

(10) Patent No.: US 7,679,490 B2
(45) Date of Patent: Mar. 16, 2010

(54) SYSTEM FOR HARMONIZING A MOTOR VEHICLE'S STATUS INFORMATION BETWEEN AT LEAST TWO ID TRANSMITTERS

(75) Inventor: Stefan Hammes, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 610 days.

(21) Appl. No.: 11/538,636

(22) Filed: Oct. 4, 2006

(65) Prior Publication Data
US 2007/0152801 A1    Jul. 5, 2007

(30) Foreign Application Priority Data
Oct. 4, 2005    (DE) .................. 10 2005 047 365

(51) Int. Cl.
*B60R 25/10*    (2006.01)
*G06F 19/00*    (2006.01)

(52) U.S. Cl. .................. 340/426.15; 340/426.13; 340/426.17; 340/426.35; 340/426.36; 340/825.72; 307/10.1; 701/32

(58) Field of Classification Search ............ 340/426.15, 340/426.35, 426.36
See application file for complete search history.

(56) References Cited

U.S. PATENT DOCUMENTS

| 5,719,550 A | 2/1998 | Bloch et al. .............. 340/10.34 |
| 6,775,603 B2 * | 8/2004 | Yester et al. .................. 701/36 |
| 6,895,316 B2 * | 5/2005 | Chen et al. ..................... 701/36 |
| 2002/0109587 A1 | 8/2002 | Attring et al. ............ 340/426.1 |
| 2004/0158371 A1 * | 8/2004 | Iggulden et al. ............... 701/29 |
| 2005/0134477 A1 | 6/2005 | Ghabra et al. .......... 340/825.72 |

FOREIGN PATENT DOCUMENTS

| DE | 10 2004 049 664 A1 | 7/2005 |
| DE | 10 2004 006 734 A1 | 9/2005 |
| EP | 1216901 | 6/2002 |
| GB | 2409317 | 6/2005 |

* cited by examiner

*Primary Examiner*—Donnie L Crosland
(74) *Attorney, Agent, or Firm*—King & Spalding L.L.P.

(57) ABSTRACT

In a system for harmonizing a motor vehicle's status information (S1) between at least two ID transmitters (5, 6, ...) of a vehicle-accessing device, the vehicle status (S1), together with a reference time (t1), corresponding to the vehicle status (S1), of a reference timing element of a vehicle-side control unit (2) can be sent by the unit via at least one transceiver unit (3) to at least one first mobile ID transmitter (5) over a first radio transmission (4) and stored; and the vehicle status (S1) can be sent over a second radio transmission (7) from the first ID transmitter (5) to at least one second ID transmitter (6, ...) and stored. This is advantageous in that an ID transmitter (6) can obtain information about the vehicle status S1 not only via the vehicle (1) itself but also via another ID transmitter (5). The invention is especially suitable for accessing and locking systems for motor vehicles.

26 Claims, 3 Drawing Sheets

SYSTEM FOR HARMONIZING A MOTOR VEHICLE'S STATUS INFORMATION BETWEEN AT LEAST TWO ID TRANSMITTERS

PRIORITY

This application claims priority from German Patent Application No. DE 10 2005 047 365.2, which was filed on Oct. 4, 2005, and is incorporated herein by reference in its entirety.

TECHNICAL FIELD

The invention relates to a system for harmonizing a motor vehicle's status information between at least two ID transmitters of a vehicle-accessing device.

BACKGROUND

Vehicle-accessing systems have for some time now made increasing use of bidirectional radio connections, alongside unidirectional radio links, between a vehicle and a portable identification (ID) transmitter, with use being made of, inter alia, the possibility of transmitting information concerning the vehicle status, in particular the vehicle's locked/unlocked condition, from the vehicle to the ID transmitter, and displaying and storing it there. The user is thereby enabled to call up the vehicle status last stored in the ID transmitter also outside the receiving range of the transmitter installed in the vehicle. The problem arising here is that, as a rule, only the last used ID transmitter receives the information about the vehicle status because other ID transmitters (an "extra key", for example) belonging to the vehicle were either not within the vehicle's radio range while the vehicle status was transmitted or, in order to save energy, cannot operate permanently in the receive mode and so cannot receive the vehicle's current status.

What is disadvantageous therein is that only one ID transmitter has stored the vehicle's current status. Other ID transmitters belonging to the vehicle have stored either no vehicle status or an earlier and hence out-of-date one.

SUMMARY

The object of the present invention is hence to provide an improved system for harmonizing a motor vehicle's status information between at least two ID transmitters, which system will ensure that information about the vehicle's current status will have been stored in the case of all ID transmitters belonging to a vehicle.

The invention is distinguished by a system for harmonizing a motor vehicle's status information between at least two ID transmitters of a vehicle-accessing device, with which system the vehicle status, together with a reference time, corresponding to the vehicle status, of a reference timing element of a vehicle-side control unit can be sent by said unit via at least one transceiver unit to at least one first mobile ID transmitter over a first radio transmission and stored; and the vehicle status can be sent over a second radio transmission from the first ID transmitter to at least one second ID transmitter and stored.

Communication between the ID transmitters can in a preferred embodiment of the invention be activated by an external low-frequency signal source (e.g. low-frequency signal source LFSS shown in FIG. 2), as a result of which transmitting can advantageously be initiated automatically.

Activating takes place in a further preferred embodiment of the invention by means of a key actuation performed on at least one of the two ID transmitters, as a result of which the transmitting instant can advantageously also be initiated manually.

It has proved useful that the vehicle's locked/unlocked condition can be transmitted simultaneously with its status. The advantage thereof is that it can be checked some distance from the vehicle whether, for instance, the vehicle has been locked.

The number of ID transmitters trained to the vehicle-side control unit is expediently transmitted with the vehicle status. The duration of the radio transmission can advantageously be optimized thereby.

In a further preferred embodiment the latest vehicle status can be determined by comparing the reference times of two vehicle statuses. That advantageously ensures that only ever the vehicle's current status is conveyed.

In a further preferred embodiment of the invention the ID transmitters have an internal timing element that can be synchronized with the control unit's reference timing element. What is advantageously achieved thereby is that the internal timing element will have the current time of the vehicle status.

In a further preferred embodiment of the invention the vehicle status can be conveyed between the ID transmitters at a defined instant. Regular conveying of the vehicle's current status to all ID transmitters is ensured thereby.

In a further preferred embodiment of the invention a recognition signal can be sent by the first ID transmitter to further ID transmitters before the status information is transmitted. Increased security against attempts at accessing by means of third parties' radio signals is advantageously achieved thereby.

In a further preferred embodiment of the invention the first ID transmitter sends a request signal ("ping") to the further ID transmitters before the vehicle status is conveyed between the ID transmitters. The first ID transmitter can thereby establish if further ID transmitters are ready to communicate. The ID transmitters will consequently be only very seldom in the send or receive mode, resulting in lower energy consumption.

Communication between the ID transmitters is in a further preferred embodiment of the invention encrypted to prevent eavesdropping on the vehicle status. That is done in a simplest embodiment by employing the encryption method used for communicating with the vehicle, along with the secret encryption key that is as a rule common to all ID transmitters belonging to the vehicle, also for communication between the ID transmitters.

Data can in a further preferred embodiment of the invention be transmitted between the ID transmitters on a plurality of frequency channels. Faults on one frequency channel can advantageously be circumvented thereby. Changing over between the frequency channels can therein, for instance, adhere to a time scheme that is known among all ID transmitters and advantageously allows the sending ID transmitter's current frequency channel to be established, even allowing for the tolerance of the timing elements on the different ID transmitters, and hence the message's reception to be ensured.

The present invention is especially suitable for accessing and locking systems for motor vehicles.

BRIEF DESCRIPTION OF THE DRAWINGS

Further details and advantages will be explained with reference to the attached drawing. Shown schematically therein in FIG. 1 is a vehicle-accessing device; and in FIG. 2 is signal transmitting between ID transmitters.

In the following description of a preferred embodiment of the present invention the same reference characters are used to identify the same or comparable components.

DETAILED DESCRIPTION

Figure 1:
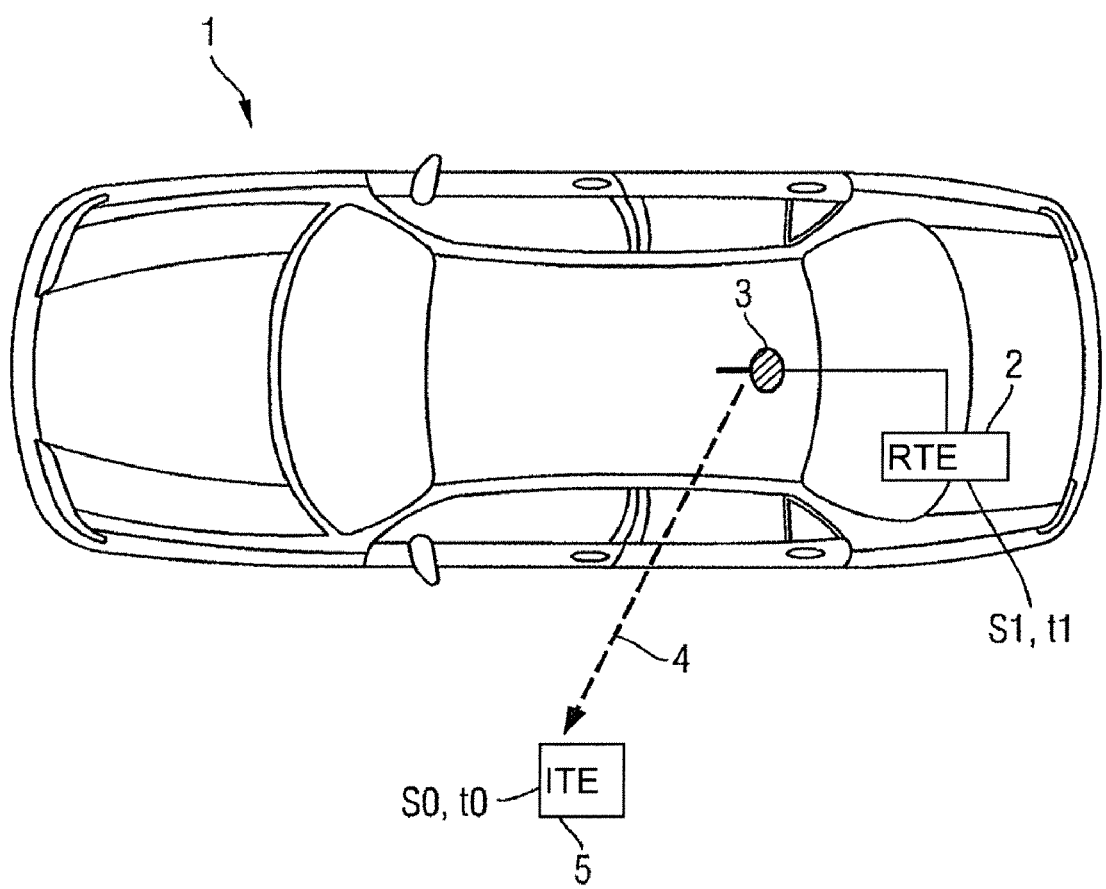

FIG. 1 shows a vehicle-accessing device of a motor vehicle 1 comprising a system for harmonizing a motor vehicle's status information S1 between at least two ID transmitters 5, 6, . . . , with which system the vehicle status S1, together with a reference time t1, corresponding to the vehicle status S1, of a vehicle-side control unit 2 can be sent by said unit via at least one transceiver unit 3 to at least one first mobile ID transmitter 5 over a first radio transmission 4 and stored; and the vehicle status S1 can be sent over a second radio transmission 7 from the first ID transmitter 5 to at least one second ID transmitter 6, . . . and stored. Because the ID transmitters are able to establish bidirectional communication with the vehicle, they are basically also able to establish bidirectional communication among each other. Said bidirectional connection between two ID transmitters 5 and 6 can be used for harmonizing the vehicle status S1.

Communication between the ID transmitters 5, 6, . . . can preferably be activated by a low-frequency radio signal. The low-frequency radio signal can be sent by a vehicle-side low-frequency antenna of the passive accessing system or, also, by means of a low-frequency disruption produced by, for example, a long-wave radio transmitter. At least one ID transmitter 5, 6, can be activated in such a way provided it is located within radio range of the vehicle 1 or of a corresponding disruptive source. What is achieved thereby is that transmission can be initiated automatically by an external activation.

Communication between two or more ID transmitters 5, 6, . . . can alternatively or additionally thereto be initiated by pressing a specific key or combination of keys on one or more ID transmitters 5, 6, . . . requiring to be synchronized. The transmitting instant can as a result also be initiated manually.

Figure 2A:
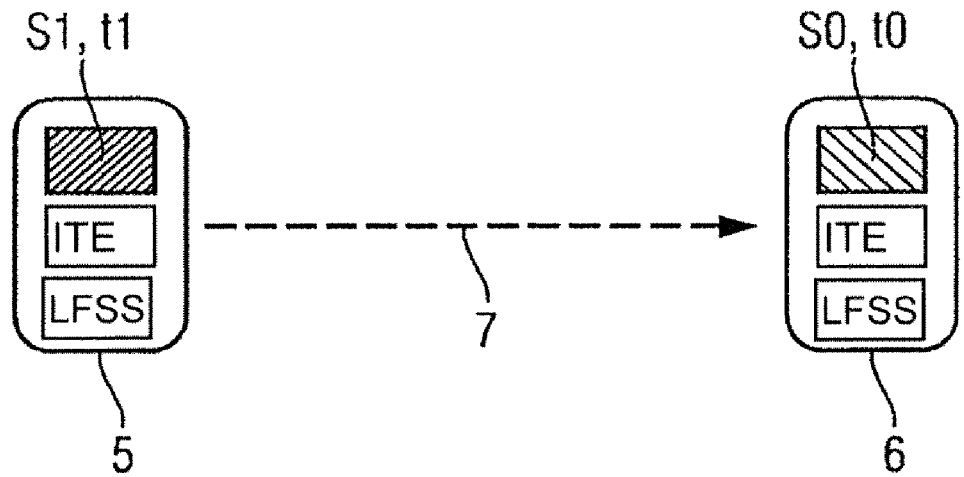

Signal transmitting between ID transmitters 5, 6, is shown by way of example in FIG. 2. FIG. 2a therein shows an ID transmitter 6 having status information S0, which transmitter will receive the status information of the ID transmitter 5, S1, conveyed over a bidirectional radio connection 7 from the ID transmitter 5, once activation has taken place through a key having been pressed or by means of a low-frequency signal. During the communicating phase the ID transmitters 5, 6, . . . send their stored vehicle status S1, together with the associated, likewise stored time t1, successively to the vehicle 1 in a pre-specified sequence resulting from, for instance, the sequence of the training process of the ID transmitters 5, 6, . . . . Unless themselves sending, the other ID transmitters 5, 6, . . . will be in the receive mode during the communicating phase. The status information will only be stored in the ID transmitter if the status S1 is more up-to-date than S0, which is to say if the time t1 is later than t0. Each ID transmitter 5, 6, . . . compares the received time t0, t1, . . . with its internally stored time t. If, therefore, an ID transmitter 6 establishes that the received time t1 is more up-to-date than the time t0 stored in its memory, then the ID transmitter 6 will store the received vehicle status S1 together with the received time t1. The ID transmitter 6 will as a result have assumed the vehicle status 5 of the first ID transmitter 5, but the first ID transmitter 5 not, though, that of the second ID transmitter 6 because its time t0 indicates out-of-date status information S0. It can hereby be advantageously determined if the latest vehicle status S1 has been stored in the ID transmitter 5 and, where applicable, has to be updated.

Figure 2B:
Figure 3:
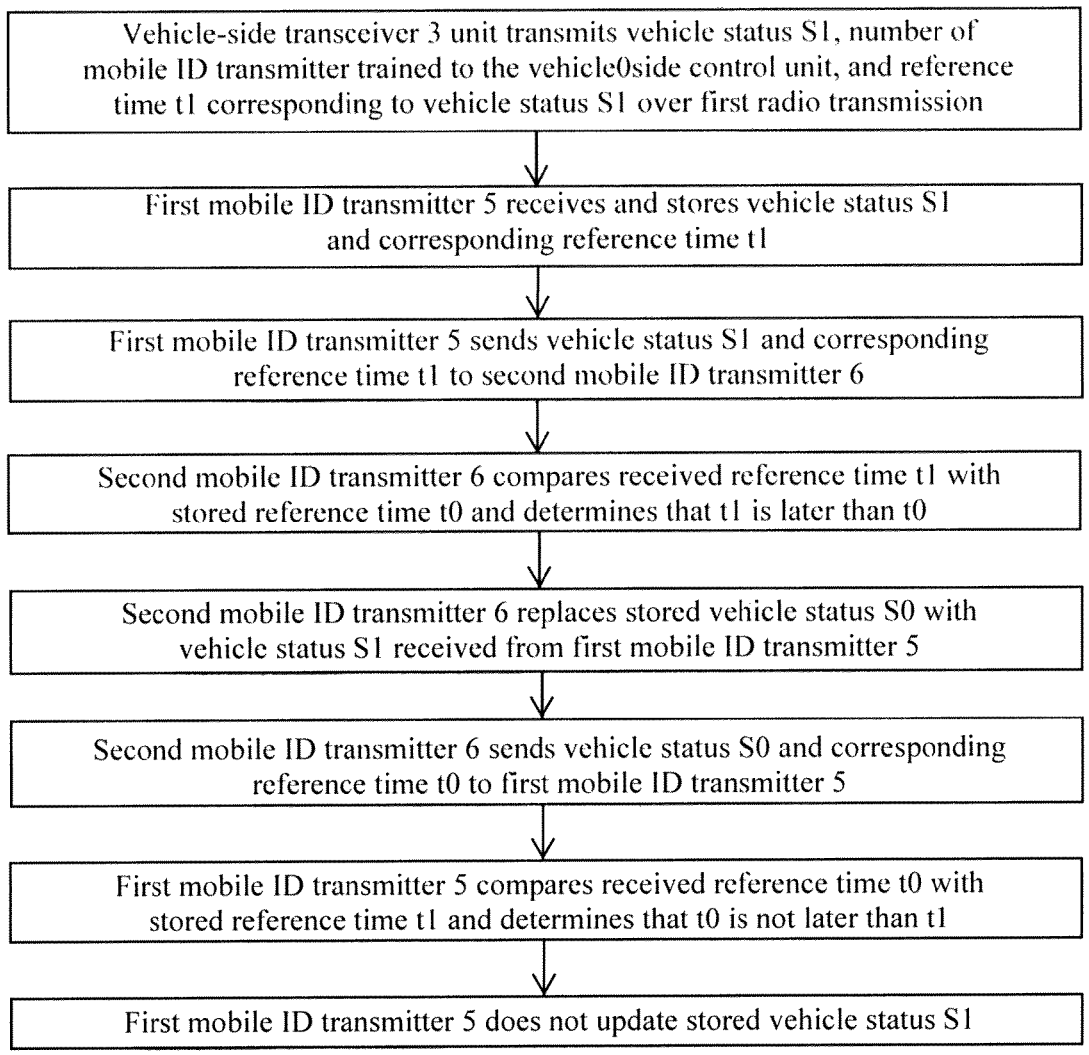
FIG. 3 illustrates an example method for harmonizing a motor vehicle's status information between at least two ID transmitters of a vehicle-accessing device, according to one embodiment.

FIG. 2b shows the two ID transmitters 5 and 6 following transmission of status information S1 having the associated stored current time t1.

It has proved useful that the locked/unlocked condition of the vehicle 1 can be conveyed with the vehicle status S1. The advantage thereof is that it can be checked some distance from the vehicle 1 whether the vehicle 1 has been locked.

The number of ID transmitters 5, 6, . . . trained to the vehicle-side control unit 2 is expediently transmitted with the vehicle status S1, with communication taking place in an established sequence, for example the training sequence. The duration of the radio transmission can be optimized thereby and colliding of the radio transmissions is avoided.

In a further preferred embodiment the latest vehicle status S1 can be determined by comparing the reference times t0, t1 of two vehicle statuses.

In a further preferred embodiment of the invention the ID transmitters 5, 6 . . . have an internal timing element that can be synchronized with the reference timing element of the control unit 2. While the vehicle status S1 is being harmonized, which also includes a conveying operation and a comparison with the reference time, conveying and harmonizing of the internal timing element of the respective ID transmitter 5, 6, . . . can be carried out in parallel. What can advantageously be achieved thereby is that the internal timing element will have the current time of the vehicle status S1.

Communication between different ID transmitters 5, 6, . . . can in a further preferred embodiment of the invention be initiated at a previously specified time; for example at 2 a.m. in each case. Regular conveying of the vehicle's current status S1 to all ID transmitters 5, 6, . . . can be ensured thereby.

In a further preferred embodiment of the invention a recognition signal can be sent by the first ID transmitter 5 to a further ID transmitter 6, . . . . It is furthermore advantageous for communication to take place only between ID transmitters having a previously stored, valid recognition signal. Increased security against attempts at accessing by means of third parties' radio signals is achieved thereby.

In a further preferred embodiment of the invention the ID transmitters 5, 6 . . . have an internal timing element that can be synchronized with the reference timing element of the control unit 2. While the vehicle status S1 is being harmonized, which also includes a conveying operation and a comparison with the reference time, conveying and harmonizing of the internal timing element ITE of the respective ID transmitter 5, 6, . . . can be carried out in parallel. What can advantageously be achieved thereby is that the internal timing element will have the current time of the vehicle status S1.

To save more energy it can be expedient to make the ID transmitters 5, 6, . . . wait in a standby mode precisely while not sending or receiving. A brief request signal could then be sent by an ID transmitter 5 to another ID transmitter 6 prior to the harmonizing or sending of a recognition signal in order to verify whether the other ID transmitter 6 is ready to receive. The similar consequence thereof would be to relieve the ID transmitters' batteries of unnecessary, unsuccessful transmission attempts, which will advantageously permit more favorable grading in the radio approval process (in the USA, for instance).

Communication between the ID transmitters 5, 6, . . . is in a further preferred embodiment of the invention encrypted to prevent eavesdropping on the vehicle status S1. That is easily possible by employing the encryption method used for communicating with the vehicle 1, along with the secret encryption key that is as a rule common to all ID transmitters 5, 6, . . . belonging to the vehicle, also for communication between the ID transmitters 5, 6, . . . .

Bidirectional communication 7 between the ID transmitters 5, 6, . . . can in a further preferred embodiment of the invention take place on a plurality of frequency channels. Faults on one frequency channel can advantageously be circumvented thereby. Changing over between the frequency channels therein adheres to a time scheme that is known among all ID transmitters 5, 6, . . . and allows the current frequency channel of the sending ID transmitter 5 to be established, even allowing for the tolerance of the timing elements on the different ID transmitters 5, 6, . . . , and hence the message's reception to be ensured.

The present invention is based on the idea that explicit interrogating of the vehicle status S1 by the ID transmitter 5 is necessary in order to obtain a current vehicle status S1 on a first ID transmitter 5, with the ID transmitter having to be within radio range of the vehicle 1. Located for said purpose in the vehicle 1 is a control device 2 that contains the information about the vehicle status S1 and forwards said information to the ID transmitter 5 via a transceiver unit 3. Moreover, by means of a bidirectional connection between ID transmitters 5, 6, . . . the vehicle status S1 can be harmonized; for example over a radio transmission 4. A corresponding reference time t1 of a reference timing element RTE of the control unit 2 is transmitted in parallel therewith. The vehicle status S1 and reference time t1 can be stored in the ID transmitters 5, 6, . . . . A prerequisite therefore is for the ID transmitters 5, 6, . . . requiring to be synchronized to be within mutual radio range, though not necessarily within radio range of the vehicle 1. This is advantageous in that an ID transmitter 5, 6, . . . can obtain information about the vehicle status S1 not only via the vehicle 1 itself but also via another ID transmitter 5.

The invention is especially suitable for accessing and locking systems of a motor vehicle 1.

What is claimed is:

1. A method for harmonizing a motor vehicle's status information between at least two ID transmitters of a vehicle-accessing device, comprising:

transmitting the current vehicle stains, together with a current reference time, corresponding to the current vehicle status, of a reference timing element of a vehicle-side control unit by said control unit via at least one radio transceiver unit for receipt by any of a plurality of mobile ID transmitters within radio range of the transceiver unit;

a first mobile ID transmitter capable of receiving transmissions from the radio transceiver unit and within range of the radio transceiver unit receiving and storing the current vehicle status and current reference time;

a second mobile ID transmitter capable of receiving transmissions from the radio transceiver unit but not within range of the radio transceiver unit not receiving the current vehicle status and current reference time, the second mobile ID transmitter storing a previous vehicle status and a previous reference time; and the first and second mobile ID transmitters subsequently synchronizing vehicle status data by radio transmissions, including:

the first mobile ID transmitter sending the current vehicle status and current reference time to the second mobile ID transmitter by radio transmission;

the second mobile ID transmitter comparing the received current reference time with its stored previous reference time, determining that the current reference time is more recent than the stored previous reference time, and in response, updating its stored previous vehicle status with the received current vehicle status.

2. The method according to claim 1, wherein transmitting of the vehicle status between the ID transmitters is activated by an external low-frequency signal source.

3. The method according to claim 1, wherein activating takes place by means of a key actuation performed on at least one of the two ID transmitters.

4. The system method according to claim 1, wherein the vehicle's locked/unlocked condition is transmitted simultaneously with the vehicle status.

5. The method according to claim 1, wherein the number of ID transmitters trained to the control unit is transmitted with the vehicle status.

6. The method according to claim 1, wherein the first and second mobile ID transmitters subsequently synchronizing vehicle status data by radio transmissions further includes:

the second mobile ID transmitter sending the previous vehicle status and previous reference time to the first mobile ID transmitter by radio transmission;

the first mobile ID transmitter comparing the received previous reference time with its stored current reference time, determining that the previous reference time is more recent than the stored current reference time, and in response, not updating its stored current vehicle status.

7. The method according to claim 1, wherein the ID transmitters have an internal timing element that is synchronized with the reference timing element of the control unit.

8. The method according to claim 1, wherein the vehicle status is conveyed between the ID transmitters at a definable instant.

9. The method according to claim 1, wherein a recognition signal is sent by the first ID transmitter to further ID transmitters before the status information is transmitted.

10. The method according to claim 1, wherein a request signal of the first ID transmitter is sent to the further ID transmitters before the vehicle status is conveyed between the ID transmitters.

11. The method according to claim 1, wherein the information is conveyed between the ID transmitters encrypted.

12. The method according to claim 1, wherein data is transmitted between the ID transmitters on a plurality of frequency channels.

13. The method according to claim 12, wherein changing over between the frequency channels adheres to a previously established scheme.

14. A system for harmonizing a motor vehicle's status information between at least two ID transmitters of a vehicle-accessing device, comprising:

a vehicle side control unit comprising a reference timing element, the control unit being designed to send the current vehicle status, together with a current reference time of the reference timing element, corresponding to the current vehicle status;

at least one radio transceiver unit for sending said current vehicle status and said current reference time for receipt by any of a plurality of mobile ID transmitters within radio range of the transceiver unit;

a first mobile ID transmitter within range such that it receives and stores the transmitted current vehicle status and current reference time, a second mobile ID transmitter out of range such that it does not receive the transmitted current vehicle status and current reference time, the second mobile ID transmitter storing a previous vehicle status and a previous reference time;

the first and second mobile ID transmitters configured to subsequently synchronize vehicle status data by radio transmissions, including:

the first mobile ID transmitter configured to send the current vehicle status and current reference time to the second mobile ID transmitter by radio transmission, such that the second mobile ID transmitter compares the current reference time with its stored previous reference time, and in response, updates its stored previous vehicle status with the received current vehicle status.

15. The system according to claim 14, wherein transmitting of the vehicle status between the ID transmitters is activated by an external low-frequency signal source.

16. The system according to claim 14, wherein activating takes place by means of a key actuation performed on at least one of the two ID transmitters.

17. The system method according to claim 14, wherein the vehicle's locked/unlocked condition is transmitted simultaneously with the vehicle status.

18. The system according to claim 14, wherein the number of ID transmitters trained to the control unit is transmitted with the vehicle status.

19. The system according to claim 14, wherein the first and second mobile ID transmitters configured to subsequently synchronize vehicle status data by radio transmissions further includes:

the first mobile ID transmitter configured to send the current vehicle status and current reference time to the second mobile ID transmitter by radio transmission, such that the second mobile ID transmitter compares the current reference time with its stored previous reference time, and in response, updates its stored previous vehicle status with the received current vehicle status; and the second mobile ID transmitter configured to send the previous vehicle status and previous reference time to the first mobile ID transmitter by radio transmission, such that the first mobile ID transmitter compares the previous reference time with its stored current reference time, and in response, does not update its stored current vehicle status.

20. The system according to claim 14, wherein the ID transmitters have an internal timing element that is synchronized with the reference timing element of the control unit.

21. The system according to claim 14, wherein the vehicle status is conveyed between the ID transmitters at a definable instant.

22. The system according to claim 14, wherein a recognition signal is sent by the first ID transmitter to further ID transmitters before the status information is transmitted.

23. The system according to claim 14, wherein a request signal of the first ID transmitter is sent to the further ID transmitters before the vehicle status is conveyed between the ID transmitters.

24. The system according to claim 14, wherein the information is conveyed between the ID transmitters encrypted.

25. The system according to claim 14, wherein data can be transmitted between the ID transmitters on a plurality of frequency channels.

26. The system according to claim 25, wherein changing over between the frequency channels adheres to a previously established scheme.

* * * * *

UNITED STATES PATENT AND TRADEMARK OFFICE
CERTIFICATE OF CORRECTION

| | | |
|---|---|---|
| PATENT NO. | : 7,679,490 B2 | Page 1 of 1 |
| APPLICATION NO. | : 11/538636 | |
| DATED | : March 16, 2010 | |
| INVENTOR(S) | : Stefan Hammes | |

It is certified that error appears in the above-identified patent and that said Letters Patent is hereby corrected as shown below:

Column 5, Line 45 "transmitting the current vehicle stains" should be deleted and replaced with --transmitting the current vehicle status--.

Signed and Sealed this

Twenty-fifth Day of May, 2010

David J. Kappos
*Director of the United States Patent and Trademark Office*